(12) United States Patent
Watson et al.

(10) Patent No.: US 6,982,412 B2
(45) Date of Patent: Jan. 3, 2006

(54) INFRA RED CAMERA CALIBRATION

(75) Inventors: Norman Frederick Watson, Edinburgh (GB); Michael Grant McGuigan, Edinburgh (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 10/506,081

(22) PCT Filed: Mar. 4, 2003

(86) PCT No.: PCT/GB03/00923

§ 371 (c)(1),
(2), (4) Date: Aug. 31, 2004

(87) PCT Pub. No.: WO03/077539

PCT Pub. Date: Sep. 18, 2003

(65) Prior Publication Data

US 2005/0103989 A1    May 19, 2005

(30) Foreign Application Priority Data

Mar. 8, 2002   (GB) .................................. 0205482

(51) Int. Cl.
*G01D 18/00*     (2006.01)
(52) U.S. Cl. .................................................. 250/252.1
(58) Field of Classification Search ............. 250/252.1
See application file for complete search history.

(56) References Cited

U.S. PATENT DOCUMENTS

| | | | |
|---|---|---|---|
| 5,354,987 A | 10/1994 | MacPherson | |
| 5,693,940 A | 12/1997 | Hutchens et al. | |
| 5,721,427 A | 2/1998 | King et al. | |
| 6,127,679 A | 10/2000 | Elliott et al. | |
| 2005/0051670 A1 * | 3/2005 | Geyer et al. ............ | 244/158 R |

FOREIGN PATENT DOCUMENTS

| | | |
|---|---|---|
| GB | 2 314 227 A | 12/1997 |
| JP | 2001 141558 A | 5/2001 |
| WO | WO 97 05742 A | 2/1997 |
| WO | WO 00 52435 A | 9/2000 |

* cited by examiner

*Primary Examiner*—David Porta
*Assistant Examiner*—Marcus Taningco
(74) *Attorney, Agent, or Firm*—Crowell & Moring LLP

(57) ABSTRACT

Described herein is a method and apparatus for calibrating an infrared camera at elevated temperatures using a reference surface. The method comprises selecting a normal well-fill condition for pixels in the camera in accordance with normal operating temperatures and stare time (30, 32, 34), using the normal well-fill condition to calculate a selected stare time/surface temperature combination for which selected non-uniform calibration coefficients are determined (36, 38), adjusting and re-adjusting the stare time/surface temperature to obtain adjusted and re-adjusted non-uniform calibration coefficients respectively (40, 42, 44, 46), and determining final non-uniform calibration coefficients for the camera using the selected, adjusted and re-adjusted non-uniform calibration coefficients (48).

8 Claims, 2 Drawing Sheets

INFRA RED CAMERA CALIBRATION

Figure 1:
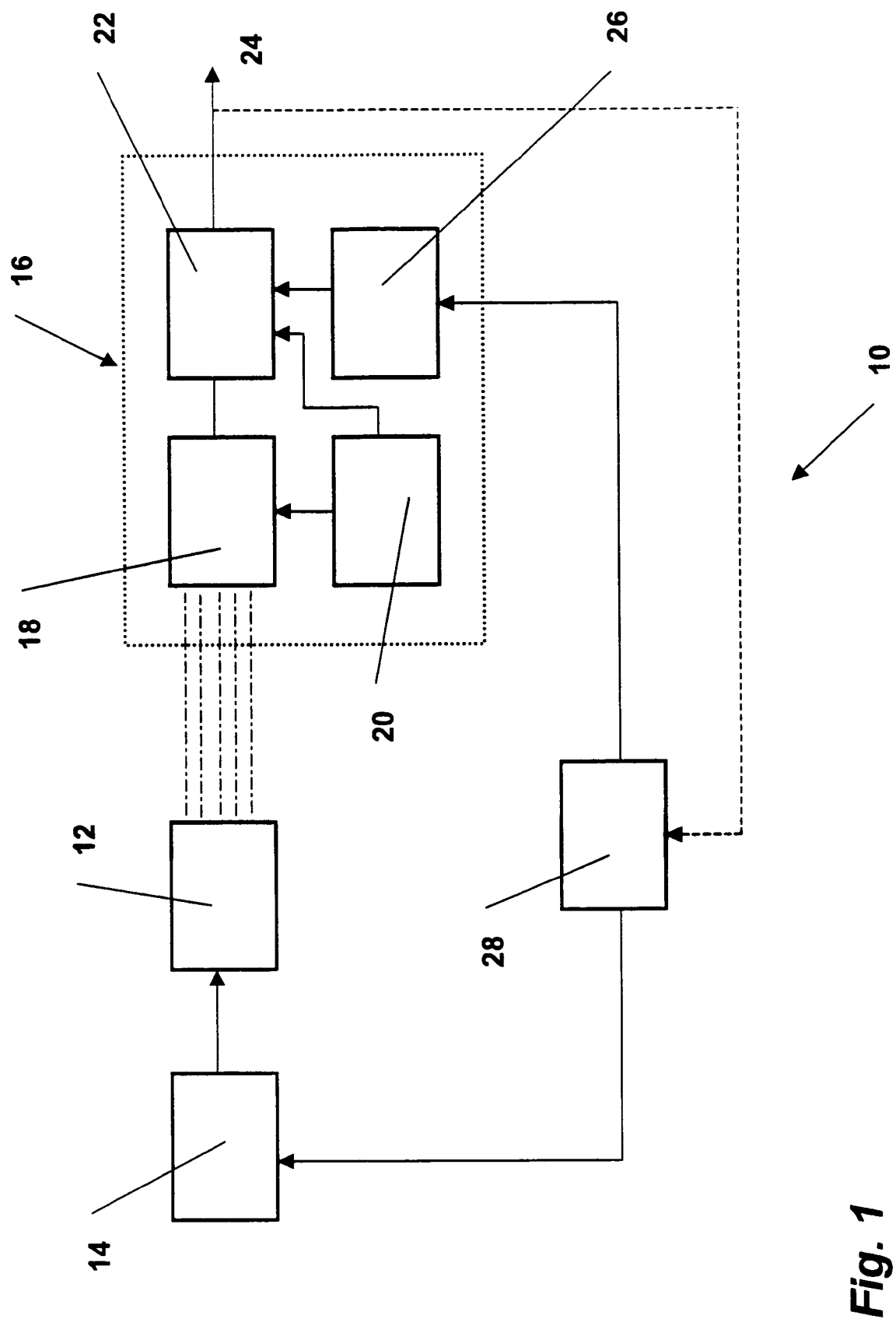

The present invention relates to improvements in or relating to infrared camera calibration, and is more particularly, although not exclusively, concerned with nonuniformity calibration.

It is known to perform internal two-point no uniformity calibration in infra red cameras at ambient temperatures above 28° C. However, it has been difficult to achieve such calibration due to the inability to control the thermal reference surface temperature to reach the desired set point for the operating temperature range of the camera based on selected stare time. The desired set point is typically 5° C. but the achievable reference surface temperature is approximately ambient temperature less 25° C. This has the disadvantage that, in applications where an infrared camera having a wide field of view is to be is used in ambient temperatures equivalent to 55° C., the achievable reference surface temperature is expected to be around 30° C. (55–25° C.). This is substantially higher than both the desired set point and the specified scene temperatures equivalent to 10° C.

Whilst it is possible to modify the calibration technique so that camera calibration can be carried out using the "best achievable" reference surface temperature, a significant shortfall in the performance of the camera is obtained relative to the performance which would be obtained if the cameo calibration is performed using its ideal set point temperature. Moreover, if single-point calibration steps are performed at temperatures which are significantly different from those which are present in a background of a scene, the advantages and benefits of such calibration steps will be substantially lost as a result of the differences between the actual calibration temperatures and the desired calibration temperatures.

U.S. Pat. No. 6,127,679 discloses a thermal sensing system for observing a scene producing luminance comprising a reference IR LED for providing a calibrated predetermined luminance, an array of photon detecting elements, at least two position optical system for controllably focusing onto the array of detecting elements luminance from either an observed scene or from reference IR LED, a switching apparatus for controllably moving said optical system between the two positions and a computer, responsive to the position of said optical system for calibrating signals from the array of detecting elements resulting from scene observation, with signals resulting from reference IR LED.

It is therefore an object of the present invention to provide a calibration method which provides for the benefits of both single-point and two-point calibration being substantially recovered whilst using achievable reference surface temperatures rather than ideal reference surface temperatures.

In accordance with one aspect of the present invention, there is provided a method of calibrating an infrared detector using a temperature-adjustable reference surface (12) within it field of view, the method being characterized by the steps of:

a) controlling the temperature of the reference surface (12) to a first surface temperature ($T_1$) and measuring the output of the detector (18) over a first stare time ($S_1$), the first temperature ($T_1$) and stare time ($S_1$) being selected so as to achieve a predetermined first well-fill ($W_{actual}$) of the detector pixels at the lowest possible temperature of the reference surface (12);

b) processing the output measurements of the detector (18) to obtain a first calibration coefficient ($coeff_{cal1}$);

c) adjusting the temperature of the reference surface (12) to a second surface temperature ($T_2$) and measuring the output of the detector (18) over a second stare time period ($S_{actual}$), the second temperature ($T_2$) and stare time ($S_{actual}$) being selected so as to achieve a second predetermined well-fill ($W_2$) of the detector pixels d) processing the output measurements of the detector (18) to obtain a second calibration coefficient ($coeff_{cal2}$);

e) readjusting the temperature of the reference surface (12) to a third surface temperature ($T_3$) and measuring the output of the detector (18) over the first stare time period ($S_1$), the third temperature ($T_3$) being selected so as to achieve the second predetermined well-fill ($W_2$) of the detector pixels over the first stare time period ($S_1$).

f) processing the output measurements of the detector (18) to obtain a third calibration coefficient ($coeff_{cal2}$); and g) adjusting the first calibration coefficient ($coeff_{cal1}$) on the basis of the second and third calibration coefficients ($coeff_{cal2}$ $coeff_{cal3}$) obtained.

Preferably, the well-fill is selected to be approximately 50%, but it will be appreciated that any other suitable well-fill value may be used according to characteristics of the infrared camera being calibrated.

The second well-fill may be selected to be near 100% but again any suitable well-fill value may be used depending an the characteristics of the infra red camera being calibrated.

According to the present invention step g) comprises determining the final non-uniform calibration coefficients in accordance with the sum of the selected and re-adjusted non-uniform calibration coefficients less the adjusted non-uniform calibration coefficients. Naturally, it will be understood that the way the non-uniform calibration coefficients for each stare time/surface temperature combination are used for the final calibration may be varied in accordance with the characteristics of the camera being calibrated.

In accordance with another aspect of the present invention, there is provided apparatus for calibrating an infrared detector, the apparatus comprising:

a temperature-controlled reference surface (12), the detector (18) being located within the apparatus to view the reference surface (12);

control means (14, 28) for controlling the temperature (T) of the reference surface (12) and the stare time (S) of the detector (12); and processing means (28) for receiving output signals from the detector (12) at first, second and third predetermined detector stare time and reference surface temperature combinations and for producing calibration coefficients corresponding to each of the first, second and third predetermined detector stare time and reference surface temperature combination, and for determining final calibration coefficients for the detector from the calibration coefficients determined for each stare time and reference surface temperature combination, characterized in that in the first stare time and reference surface temperature combination, the first temperature ($T_1$) and stare time ($S_1$) are selected so as to achieve a predetermined first well-fill ($W_{actual}$) of the detector pixels at the lowest possible temperature of the reference surface (12);

in the second stare time and reference surface temperature combination, the second temperature ($T_2$) and stare time ($S_{actual}$) are selected so as to achieve a second predetermined well-fill ($W_2$) of the defector pixels; and in the third stare time and reference surface temperature combination, the third temperature ($T_3$) is selected so as to achieve the second predetermined well-fill ($W_2$) of the detector pixels over the first stare time period ($S_1$).

Figure 2:
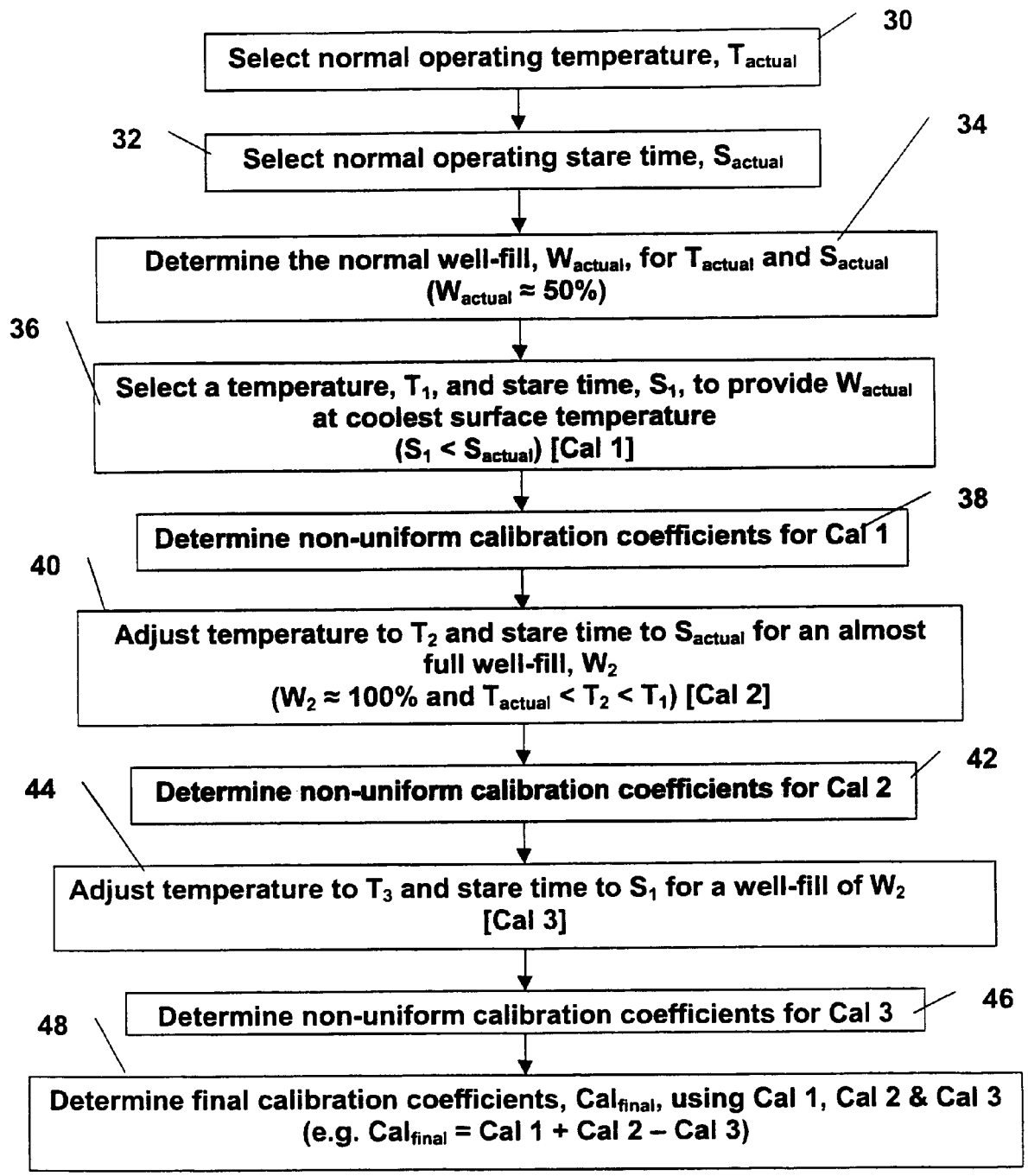

For a better understanding of the present invention, reference will now be made, by way of example only, to the accompanying drawings in which:

FIG. 1 is a block diagram illustrating calibration apparatus in accordance with the present invention; and FIG. 2 is a flow diagram illustrating the calibration process in accordance with the present invention.

In accordance with the present invention, a method will be described which allows the benefits of both single-point and, by extension, two-point calibrations to be substantially recovered, whilst using achievable reference surface temperatures instead of ideal reference surface temperatures.

Turning initially to FIG. 1, a calibration apparatus 10 is shown. The apparatus comprises a reference surface 12 whose temperature is controlled by a temperature control device 14. An infrared detector arrangement 16 which is to be calibrated is positioned so that an infrared detector 18 has the reference surface in its field-of-view. The detector has a cooling unit 20, a processor 22 and a memory unit 26 as is conventional. The processor 22 provides an output signal 24 indicative of radiation incident on the detector 18.

The calibration apparatus 10 also comprises a controller 28 which is connected to receive the output signal 24 from the detector arrangement 16 and to provide control signals for the temperature control device 14 and the memory unit 26.

When an infrared detector 18 is to be calibrated, connections as described above are made so that for each temperature of the reference surface 12, the output signal 24 is compared with the temperature in the controller 28. This provides calibration coefficients for a particular temperature which are stored in memory unit 26 for use when the detector 18 is in normal operation.

In accordance with the present invention, it is assumed that the principal sources of error which must be calibrated are pixel by pixel variations in offset and scale factor. It is possible to calibrate for offset and scale factor using a two-point, or possibly three-point, calibration technique.

It will readily be understood that an infrared detector or camera comprises an array of pixels which collects the incident radiation, and that each pixel tends to have its own characteristics which are defined as an offset value and scale factor.

For an ideal two-point calibration, the temperature of the reference surface is first controlled to have a value close to, or at, the equivalent scene temperature operating point. A selected stare time is chosen and data is collected from the detector over the selected stare time. It will be appreciated that the detector receives a de-focussed image of the reference surface over the stare time. The collected data is processed to determine correction values, for example, offset values of the pixels, at the equivalent scene temperature. The temperature of the reference surface is then altered to be different from the first temperature, that is, different from the equivalent scene temperature.

It will readily be understood that data at the first temperature is ideally used to calibrate offsets and sensitivities under the same radiance and stare time conditions under which the detector will be used and gives the same "well-fill" conditions that the detector will see from the scene. By the term "well-fill" is meant the amount of charge developed by each pixel in response to the incident radiation.

However, as it is not possible to reduce the temperature of the reference surface to provide the required radiance value, the present invention provides for a selection of a combination of stare time and reference surface temperature which provides an equivalent well-fill. This requires a reduction in stare time to offset the increased spectral radiance at higher reference surface temperatures. The relationship is dictated by Planck's law and is non-linear.

The selection of a suitable combination of stare time and reference surface temperature allows calibration at an equivalent well-fill to be performed. However, the adequacy of such a calibration depends on the effects of non-uniformity relating to changes in stare time either to be negligible or to be further calibrated out. Generally, it should be assumed that non-uniformity effects relating to changes in stare time are not negligible and need to be estimated. This can be achieved by performing two or more further calibrations at combinations of stare time and reference surface temperature which give equivalent well-fill values to one another.

In accordance with the present invention, a three-step calibration process is provided which essentially comprises three combinations of stare time and reference surface temperature to allow pixel offsets and scale factor values to be estimated for the well-fill and stare time combination which will be used in practice. This is illustrated in FIG. 2.

Suppose an infrared detector or imager is to be used with a stare time, $S_{actual}$, (step 32) and a scene temperature, $T_{actual}$, (step 30) to give a well-fill of $W_{actual}$, then $$W_{actual} = \text{function}(T_{actual}, S_{actual})$$

where $W_{actual}$ has a typical value of 50% (step 34).

The first non-uniform calibration step, Cal 1, is performed at $T_1$ and $S_1$ to give a well-fill $W_{actual}$ at the coolest possible reference surface temperature (step 36). This means that $S_1$ is a shorter stare time than that used in practice, $S_{actual}$.

The compensation (that is, the non-uniform calibration coefficients (step 38)) obtained is correct in terms of well-fill, but is in error if the detector has non-uniform sensitivities to the change in stare time from $S_{actual}$ to $S_1$. These sensitivities can be measured and compensated by two further calibration steps.

The second calibration step, Cal 2, is performed at an intermediate surface temperature of $T_2$ and at a stare time of $S_{actual}$. This gives a well-fill of $W_2$ which is, for example, near 100% well-fill (step 40). The non-uniform calibration coefficients are determined in step 42.

The third calibration step, Cal 3, is performed at a surface temperature of $T_3$ using a stare time of $S_1$ to give a well-fill of $W_2$ (step 44) and the non-uniform calibration coefficients are determined in step 46.

It will be appreciated that each of the second and third calibration steps provides non-uniform calibration coefficients, and these non-uniform calibration coefficients can be used to determine if any adjustment is needed for the first non-uniform calibration step. In this example, the difference between the second and third non-uniform calibration coefficients is used to effect adjustment of the first non-uniform calibration (step 48). However, it will be understood that the second and third calibration coefficients may be used in different ways to achieve adjustment of the first non-uniform calibration coefficient.

It is expected that all three calibration steps are performed at achievable temperatures and stare times.

The final non-uniform calibration coefficients, $\text{coeff}_{final}$, can be expressed as:

$$\text{coeff}_{final} = \text{coeff}_{Cal1} + \text{coeff}_{Cal3} - \text{coeff}_{Cal2}$$

The method of the present invention is very simple in practice, although some new surface temperature set points and corresponding stare times need to be calculated and tested to achieve equivalent well-fills. Moreover, the non-uniform calibration coefficients from three tests need to combined as described above.

The method of the present invention has the advantage that hotter surface temperatures can be utilised during calibration than is conventionally required.

What is claimed is:

1. A method of calibrating an infrared detector using a temperature-adjustable reference surface within its field of view, the method being characterized by the steps of:
    a) controlling the temperature of the reference surface to a first surface temperature and measuring the output of the detector over a first stare time, the first temperature and stare time being selected so as to achieve a predetermined first well-fill (Wactual) of the detector pixels at the lowest possible temperature of the reference surface;
    b) processing the output measurements of the detector to obtain a first calibration coefficient ($\text{coeff}_{cal1}$);
    c) adjusting the temperature of the reference surface to a second surface temperature and measuring the output of the detector over a second stare time period (Sactual), the second temperature and stare time (Sactual) being selected so as to achieve a second predetermined well-fill of the detector pixels
    d) processing the output measurements of the detector to obtain a second calibration coefficient ($\text{coeff}_{cal2}$);
    e) re-adjusting the temperature of the reference surface to a third surface temperature and measuring the output of the detector over the first stare time period, the third temperature being selected so as to achieve the second predetermined well-fill of the detector pixels over the first stare time period;
    f) processing the output measurements of the detector to obtain a third calibration coefficient ($\text{coeff}_{cal3}$); and
    g) adjusting the first calibration coefficient ($\text{coeff}_{cal1}$) on the basis of the second and third calibration coefficients ($\text{coeff}_{cal2}$, $\text{coeff}_{cal3}$) obtained.

2. A method according to claim 1, wherein the first predetermined well-fill of the pixels is approximately 50%.

3. A method according to claim 1, wherein the second predetermined well-fill of the pixels is approximately 100%.

4. A method according to claim 1, wherein step g) comprises determining a final calibration coefficient in accordance with the sum of the first ($\text{coeff}_{cal1}$) and third ($\text{coeff}_{cal3}$) calibration coefficients less the second ($\text{coeff}_{cal2}$) calibration coefficient.

5. Apparatus for calibrating an infrared detector, the apparatus comprising:
    a temperature-controlled reference surface, the detector being located within the apparatus to view the reference surface;
    control means for controlling the temperature of the reference surface and the stare time of the detector; and
    processing means for receiving output signals from the detector at first, second and third predetermined detector stare time and reference surface temperature combinations and for producing calibration coefficients corresponding to each of the first, second and third predetermined detector stare time and reference surface temperature combination, and for determining final calibration coefficients for the detector from the calibration coefficients determined for each stare time and reference surface temperature combination, characterized in that
    in the first stare time and reference surface temperature combination, the first temperature and stare time are selected so as to achieve a predetermined first well-fill (Wactual) of the detector pixels at the lowest possible temperature of the reference surface;
    in the second stare time and reference surface temperature combination, the second temperature and stare time (Sactual) are selected so as to achieve a second predetermined well-fill of the detector pixels; and
    in the third stare time and reference surface temperature combination, the third temperature is selected so as to achieve the second
    predetermined well-fill of the detector pixels over the first stare time period.

6. Apparatus according to claim 5, wherein the first predetermined well-fill of the pixels is approximately 50%.

7. Apparatus method according to claim 5, wherein the second predetermined well-fill of the pixels is approximately 100%.

8. Apparatus according to claim 5, wherein the final calibration coefficient is determined in accordance with the sum of the first ($\text{coeff}_{cal1}$) and third ($\text{coeff}_{cal3}$) calibration coefficients less the second ($\text{coeff}_{cal2}$) calibration coefficient.

* * * * *